United States Patent [19]

Sears et al.

[11] Patent Number: 4,510,124
[45] Date of Patent: Apr. 9, 1985

[54] SYSTEM FOR RECOVERY OF $CO_2$ FROM FLUE GASES CONTAINING $SO_2$

[75] Inventors: John T. Sears, Bozeman, Mont.; Harish R. Anada, Morgantown, W. Va.

[73] Assignee: Science Applications, Inc., La Jolla, Calif.

[21] Appl. No.: 549,895

[22] Filed: Nov. 9, 1983

[51] Int. Cl.³ .................... C01B 31/20; B01D 53/34
[52] U.S. Cl. .................................. 423/437; 423/232; 423/233; 423/242; 423/428
[58] Field of Search ............... 423/232, 233, 242 A, 423/428, 437

[56] References Cited

U.S. PATENT DOCUMENTS

| | | | |
|---|---|---|---|
| 1,992,324 | 2/1935 | Rusberg | 423/428 |
| 2,997,366 | 8/1961 | Owens et al. | 423/232 |
| 3,264,056 | 8/1966 | Konz | 423/232 |
| 3,944,649 | 3/1976 | Field et al. | 423/242 A |
| 4,377,557 | 3/1983 | Lowell | 423/242 A |

OTHER PUBLICATIONS

Sears, "Determination of the Effects of Sulfur Dioxide on Recovery Systems for $CO_2$", Final Report 1977–1980, U.S. Dept. of Energy MC/5532-7, published Jan. 1981, 60 pages.

Primary Examiner—Earl C. Thomas
Attorney, Agent, or Firm—Bruno J. Verbeck; Michael L. Slonecker

[57] ABSTRACT

An improved system for recovering $CO_2$ from flue gases containing $SO_2$ at low $CO_2$ partial pressure. The system includes the use of $K_2CO_3$ as the solvent, regeneration of the solvent, and removal of $SO_2$ and $SO_4$.

5 Claims, 2 Drawing Figures

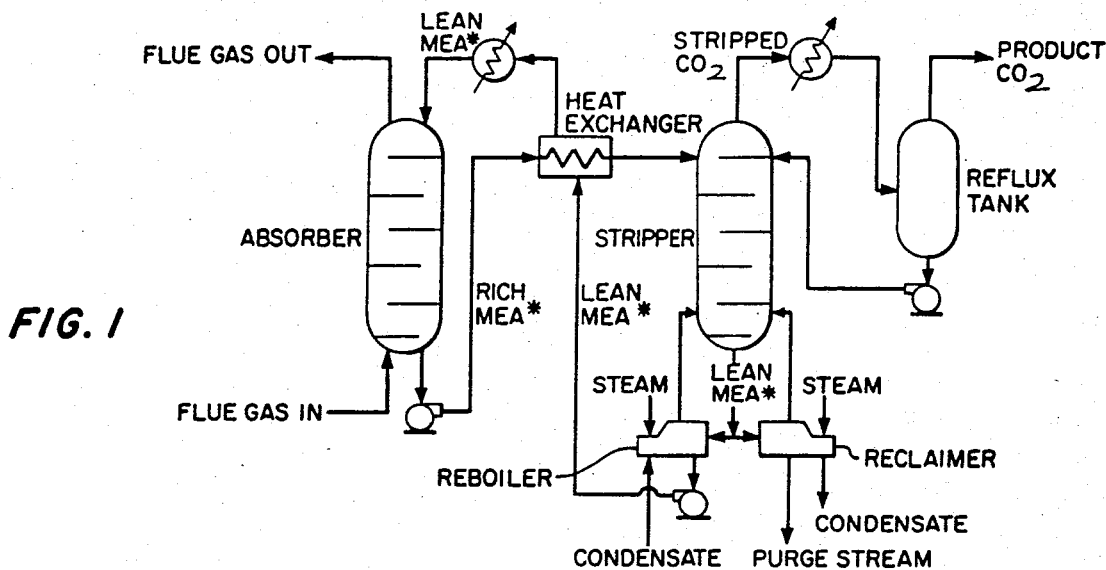
FIG. 1
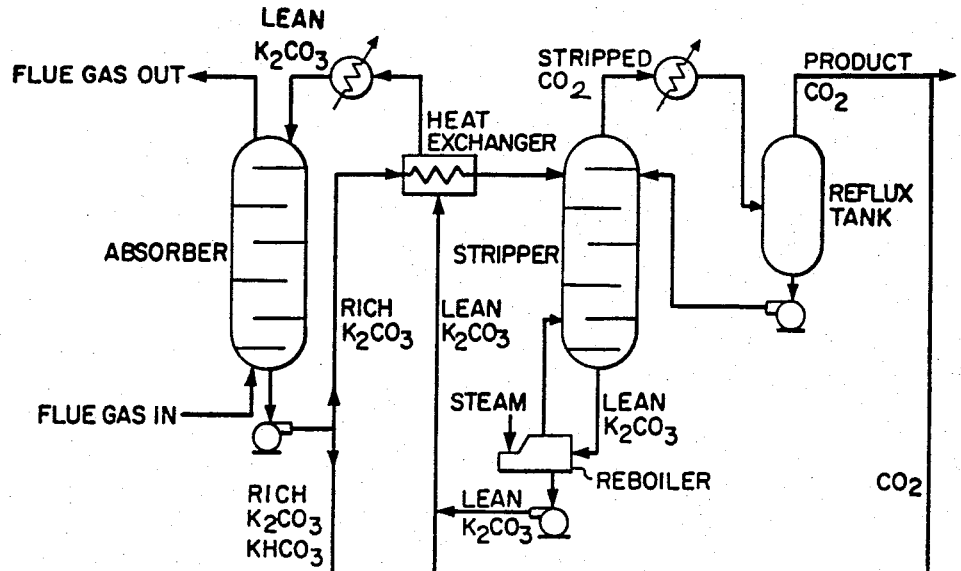
FIG. 2
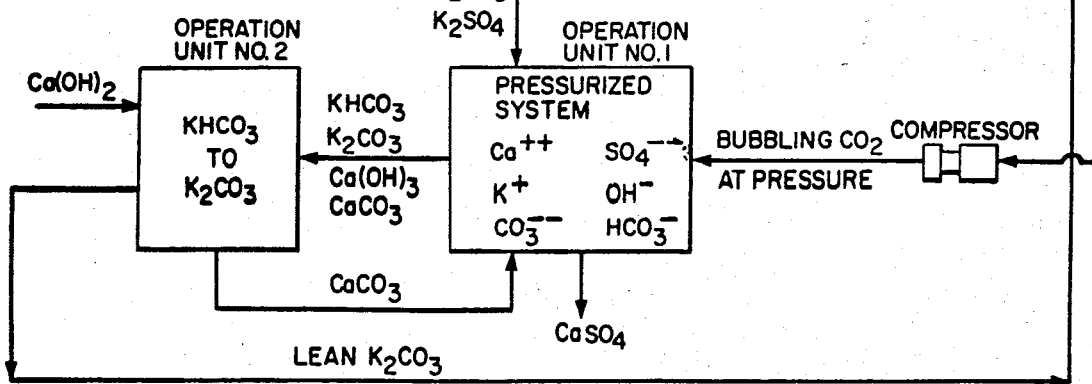

SYSTEM FOR RECOVERY OF CO₂ FROM FLUE GASES CONTAINING SO₂

FIELD OF THE INVENTION

The invention is directed to an improved system for recovering $CO_2$ from flue gases and the like containing $SO_2$, at low $CO_2$ partial pressure, and includes the use of $K_2CO_3$ as the solvent for the $CO_2$ and $SO_2$, regeneration of the solvent, and removal of $SO_2$ as $SO_4$.

BACKGROUND OF THE INVENTION

An important and increasing demand for carbon dioxide stems from its utilization for enhancing the recovery of oil. Because neither the present nor the future demand for carbon dioxide can be met from available natural deposits of $CO_2$, alternate sources have been and are being utilized. One of the most abundant sources of alternate $CO_2$ supply lies in flue gases from fossil fuel-fired plants. Many of these plants burn fuel which contains sulfur compounds which are emitted as $SO_2$ in the resulting flue gases. One currently known and used $CO_2$ recovery process includes the use of monoethanolamine or potassium carbonate as an adsorbent for the $CO_2$. In processes using such absorbents, flue gas $SO_2$ is also absorbed along with $CO_2$ in an absorber. Subsequent stripping which removes $CO_2$ does not remove the bulk of $SO_2$, which stays within the system. For example, if $K_2CO_3$ is used as a solution, $SO_2$ stays as $K_2SO_4$. The degenerates the solution, e.g., potassium carbonate, and reduces its absorption efficiency. The resulting contaminated solution must then either be regenerated, or purged from the system. Present commercial practice is to purge the contaminated solution, a procedure requiring a large amount of make-up solution and increasing operating costs. These factors discourage and even prohibit the applicability of the process, especially to coal-fired power plants which use sulfur-containing coals.

There are available, in fact, a number of processes for the removal of $CO_2$, and such other acid gases as $H_2S$, $SO_2$, and the like from gas streams, using either a solid adsorbent or a liquid absorbent. These processes can be further divided into two groups, namely those which employ chemical solvents which chemically absorb the acid gas, and those which employ physical solvents which physically absorb the acid gas. The choice of solvent is important because the amount of solvent and the solvent circulation rates normally determine the size of equipment required, and, accordingly, substantially affects the overall cost of acid-gas recovery.

Among the pertinent commercial processes available are those set forth below. They use chemical or physical solvents, as indicated.

Chemical Solvents

Amines: Monoethanolamine, Diethanolamine, Triethanolamine, Diisopropylamine, Diglycolamine Activated hot potassium carbonate: Benfield, Vetrocoke, Catacarb, Lurgi, Vacuum Carbonate Others: Stretford, Scott, Tripotassium. Phosphate, Ammonia, Copper Liquor, Alkazid, Ferrox, Manchester, Konox, Sulfox, Seaboard, Thylox, Sodium Phenolate Physical Solvents: Fluor, Purisol, Rectisol, Selexol, Sulfinol (really a mixed chemical-physical solvent), Water Solvent selection is normally based on the temperature of the feed gas, and the partial pressure of the acid gas in the feed gas stream. If $CO_2$ partial pressures in the feed gas stream are low, then the physical solvents can be eliminated because compression of the gas for physical solvent absorption makes this particular mode of $CO_2$ recovery too expensive. Because low purity by-product $CO_2$ streams, such as flue gases, have low $CO_2$ partial pressures, which range from about 1.3 to about 4.3 psi, chemical solvents are the only practical solvents which are suitable for $CO_2$ recovery. Two typical prior art processes utilizing monoethanolamine (MEA) and potassium carbonate are briefly described hereinafter.

THE BASIC MEA PROCESS

Use of alkanolamines for the adsorption of acid gases was described at an early date, in U.S. Pat. No. 1,783,901 issued in 1930, showing the use of triethanolamine (TEA) as an absorbent for acid gases in natural gas treating plants. The development of processes using other alkanolamines followed. Because of their reactivity and availability at low cost, monoethanolamine and diethanolamine have become especially prominent in the gas-sweetening industry.

A simplified process flow diagram for $CO_2$ recovery using monoethanolamine is shown in FIG. 1 of the drawings. There is very little variation in the process, regardless of the strength of the MEA solution used. In this process about 10 to 30 weight percent MEA solutions are typical; the two main pieces of equipment are the absorber column—normally either a packed bed or a plate tower, and the stripper column which is normally a plate tower.

The $CO_2$-bearing gas stream enters at the bottom of the absorber column and flows upwardly through the absorber in intimate counter-current contact with the aqueous amine solution. The depleted gas stream leaves the top of the absorber and is vented to the atmosphere through the stack for flue gas. This stream may be heated by mixing it with untreated flue gas for plume rise if necessary. The rich amine solution, laden with $CO_2$ flows from the bottom of the absorber and passes through the amine-amine heat exchanger and then to the top of the stripper column. The solution is boiled at the bottom of the stripper by heating the aqueous solution in the reboiler. Steam (primarily) then rises upwardly in counter-current contact with the rich amine solution. The $CO_2$ is stripped out of the amine solution, and the $CO_2$ gas rises to the top of the stripper with the steam. After condensing the major part of the steam from the $CO_2$-steam mixture, a rich $CO_2$ stream is produced which requires only some additional drying and compression before it is ready to use for enhanced oil recovery. At the bottom of the stripper the amine solution, which is now lean in $CO_2$, is pumped through the amine-amine heat exchanger and then through a water or air cooled exchanger, before being introduced into the top of the absorber column.

A number of difficulties are associated with $CO_2$ absorption systems utilizing monoethanolamine as the solvent, these being broadly categorized as corrosion, solution degradation, and foaming. Corrosion occurs because an acid gas is being treated in an aqueous environment, and it will be most severe at those places where the highest concentrations of $CO_2$ encounter the highest temperatures. These places will include the amine-amine heat exchanger, the stripping column, and the reboiler. Stress corrosion, which is also prevalent in systems using alkanol amines, is generally associated with residual stresses resulting from localized heating during vessel construction, such as welds in absorbers, strippers, and piping.

Solution degradation can occur for a number of reasons, resulting from, e.g. the entrainment of solids, sulfur pickup, and the formation of dissolved salts. In order to recover much of the fouled solution, about 3% of the solution circulation rate is taken for most byproduct streams, as a side stream, just before the reboiler. This side stream passes to an amine reclaimer, where the water and the amine are distilled from the fouled solution and then returned to the bottom of the stripper column.

Foaming in the amine $CO_2$ recovery process can result in a severe reduction in gas throughput, a reduction in the amount of $CO_2$ absorbed, and in a significant increase in amine loss. The foaming problem can be caused by almost any foreign material including, for example, suspended solids and amine degredation products.

POTASSIUM CARBONATE PROCESSES OF THE PRIOR ART

The fact that potassium carbonate can be used to remove $CO_2$ from a mixture of gases has been known for many years. Kohl and Riesenfeld cite a German patent granted in 1904 describing a process for absorbing $CO_2$ in a hot solution of potassium carbonate followed by stripping the solution through pressure reduction without additional heating. Kohl, A. L., and F. C. Reisenfeld, *Gas Purification,* third edition: Gulf Publishing Company, Houston, Tex., pages 187–211 1979. A highly improved form of this process is in commercial operation for acid-gas removal from high pressure streams, e.g., $CO_2$ removal from gas at high $CO_2$ partial pressures, such as those in ammonia plants, natural gas processing plants, and hydrogen plants.

In an activated potassium carbonate process, which could be economical compared to the above-described process using MEA, especially when sulfur is present, and discussed in West Virginia University DOE Contract EF-77-C-03-1582, Final Report, June 1980, entitled "Determination of the Effects of Sulfur Dioxide on Recovery Systems for $CO_2$" by J. T. Sears, the process flows for the potassium carbonate would be similar to the one above-described for the MEA system. IN a hot potassium carbonate system the absorber operates at higher temperatures, thus reducing the amount of heat exchange surface area needed, and thereby reducing the number and size of heat exchangers between the absorber and the stripper. In the modification for its use for recovery of low partial pressure $CO_2$ streams, the absorber is at a lower temperature and more heat exchange surface is required.

An alternative is to utilize a process similar to the vacuum carbonate process such as disclosed in *Gas Purification,* third edition, Gulf Publishing Company, Houston, Tex., by Kohl and Riesenfeld, pages 187–211 (1979). This process would eliminate the rich-lean $K_2CO_3$ heat exchanger and would operate the stripping column at reduced pressures. This change would increase the stripper column diameter, but would decrease steam regeneration requirements. Either alternative could operate down to 0.4 psia outlet-$CO_2$ partial pressure, according to present conventional commercial system practice.

The reactions that occur can be represented by the following:

$CO_2$ absorption $$K_2CO_3 + H_2O + CO_2 \rightleftharpoons 2KHCO_3 \quad (1)$$

This reaction proceeds in two steps:

$$K_2CO_3 + H_2O \rightleftharpoons KOH + KHCO_3 \quad (1A)$$

$$KOH + CO_2 \rightleftharpoons KHCO_3 \quad (1B)$$

The $KHCO_3$ produced as a result of the above reactions can be regenerated to $K_2CO_3$ in the stripper at higher temperatures. Since the above reactions are slow and limit $CO_2$ adsorption rates at low partial pressures, activators have been incorporated in order to increase absorption rates by initial reaction with the dissolving $CO_2$ (e.g. Benfield, Catacarb). This increase in absorption activity is important for a $K_2CO_3$ based process. The activator—$CO_2$ product then reacts with the alkaline potassium solution.

Similar to the MEA system above-described, and in FIG. 1, the $CO_2$ bearing gas enters at the bottom of the absorber column and flows upward through the absorber in intimate counter-current contact with lean potassium carbonate solution entering from the top of the absorber. The depleted gas stream leaves the top of the absorber and is vented to the atmosphere after water wash to recover any entrapped potassium carbonate solution. The depleted gas may be heated if necessary. The rich potassium carbonate solution laden with $CO_2$ flows from the bottom of the absorber, passes through the rich lean $K_2CO_3$ heat exchanger, and then to the feedplate of the stripper column. Steam is produced at the bottom of the stripper by heating the aqueous potassium carbonate solution in the reboiler, and the steam then rises upward in counter current contact with the rich potassium carbonate solution. The $CO_2$ is stripped from the rich potassium carbonate solution ($2KHCO_3 \rightarrow K_2CO_3 + H_2O + CO_2$), and the $CO_2$ gas rises to the top of the stripper with the steam. After condensing the major part of the steam from the $CO_2$-steam mixture, it is returned to the stripper through the reflux tank via the reflux pump. The uncondensed part of the $CO_2$-rich gas stream requires only some further drying and compression before the $CO_2$ is ready for use, as in enhanced oil recovery. At the bottom of the stripper, the potassium carbonate solution which is now lean in $CO_2$ after passing through the reboiler, is pumped to the top of the absorber through the rich/lean $K_2CO_3$ heat exchanger and the lean $K_2CO_3$ cooler.

$SO_2$ CONTAINING FLUE GASES

As stated previously, flue gases will contain $SO_2$ when sulfur-containing fuel is burned, a situation typified in the operation of many coal-fired power and cement plants. In the presence of oxygen, $SO_2$ reacts with $K_2CO_3$ as follows:

$$K_2CO_3 + SO_2 + \tfrac{1}{2}O_2 + H_2O \rightarrow K_2SO_4 + H_2O + CO_2 \quad (2)$$

This reaction proceeds in the following steps:

$$SO_2 + H_2O \rightleftharpoons H_2SO_3 \quad (2A)$$

$$H_2SO_3 + \tfrac{1}{2}O_2 \rightleftharpoons H_2SO_4 \quad (2B)$$

$$H_2SO_4 + K_2CO_3 \rightarrow K_2SO_4 + H_2O + CO_2 \quad (2C)$$

The $K_2SO_4$ produced by the above reactions can not be regenerated in the stripper and will reduce the capacity for $SO_2$ and $CO_2$ adsorption unless $K_2SO_4$ is separated from the $K_2CO_3$ solution. The corrosion rate of the solution, and the steam requirements for desorption of $CO_2$ also increase with increase in $SO_2$ contamination of the $K_2CO_3$ solution.

This problem can be solved by purging the contaminated solution before it is recirculated to the absorber, the amount of purging and the composition of the $K_2CO_3$ solution required depend on the amount of $SO_2$ in the $CO_2$-containing stream of the flue gas being treated, and on the size of the $CO_2$ recovery system. When the $SO_2$ impurity is above a certain level, typically about 50 to 60 ppm, the purging of contaminated solution is no longer ecconomically feasible. Thus, such a system can not be economically used for $CO_2$ recovery from many potential $CO_2$ supply sources such as coal-fired power and cement plants.

At the present time use of the $K_2CO_3$ system for $CO_2$ recovery from flue gases is not commercially attractive because the monoethanolamine (MEA) process is cheaper in those cases where the flue gases contain little or no sulfur and the solution can be purged without significant impact on the overall cost.

SUMMARY OF THE INVENTION

The present invention is directed to providing process alternatives for $CO_2$ recovery systems using $K_2CO_3$ so that the $SO_2$ contaminated absorption medium (solution) can be regenerated instead of purged. The system of the invention is generally similar to the process of absorption and desorption of $CO_2$ as discussed above, except for the addition of an $SO_2$ removal procedure, which involves converting $K_2SO_4$ to $CaSO_4$ using procedures as described hereinafter.

The invention will be better understood when considered in light of the following detailed description together with the drawings in which:

FIG. 1 is a simplified flow diagram illustrating conventional processes for $CO_2$ removal from gases utilizing $K_2CO_3$ or MEA as the absorbent.

FIG. 2 is also a simplified flow diagram, but illustrating the improved process of the invention.

In the practice of our invention, the $SO_2$- and $CO_2$-containing gas stream enters the bottom of the absorber column and flows upwardly through the absorber in intimate counter-current contact with 20–30% lean potassium carbonate solution entering from the top of the absorber. The $CO_2$ and $SO_2$ are absorbed in the solution as shown by the following overall reactions:

$$K_2CO_3 + H_2O + CO_2 \rightleftharpoons 2KHCO_3 \quad (1)$$

$$K_2CO_3 + \tfrac{1}{2}O_2 + SO_2 + H_2O \rightarrow K_2SO_4 + CO_2 + H_2O \quad (2)$$

The depleted gas stream leaves the top of the absorber and is vented to the atmosphere after an optional water wash (not shown) to recover any trapped potassium carbonate solution. The rich potassium carbonate solution containing $K_2SO_4$ leaves the bottom of the absorber and proceeds to the stripper for regeneration. If $K_2SO_4$ is not removed, it accumulates in the system, thereby reducing the absorption efficiency of the system and increasing the steam requirements.

In this novel system, a portion of the rich $K_2CO_3$ solution containing $KHCO_3$, $K_2CO_3$, and $K_2SO_4$ is sent to the $SO_2$ removal system.

The process of the present invention includes two major unit operations shown in the drawing as unit operation #1 and #2. In unit operation #1, $K_2SO_4$ is converted to $CaSO_4$ by incorporating $Ca^{++}$ ions by adding a lime (or limestone) solution to the solution of rich $K_2CO_3$ containing $K_2SO_4$ while bubbling $CO_2$ through the mixture at a pressure of about 150 psi. $CO_2$ is bubbled through the system to reduce the pH of the solution to about 6, so that more calcium ions can be added to the system without precipitation of $Ca(OH)_2$ or $CaCO_3$, thereby enhancing the conversion of $K_2SO_4$ to $CaSO_4$. The exact temperature of the system, the amount and concentration of $Ca(OH)_2$ or $CaCO_3$ to be added, and the $CO_2$ bubbling rate and pressure, can be readily determined from solubility product data at various concentrations. The solid $CaSO_4$ is then separated from the liquor and the separated liquor is then sent to Unit Operation #2. The principal function of this unit operation is to separate calcium ions from the liquor before it is sent back to the absorber, and is accomplished in a closed tank by adding $Ca(OH)_2$ to change the pH to a higher value. The following reactions would occur:

$$Ca(OH)_2 \rightleftharpoons (Ca)^{++} + 2(OH^{--})$$

$$2KHCO_3 \rightleftharpoons 2(K^+) + 2(HCO_3)$$

$$(OH) + (HCO_3) \rightarrow H_2O + (CO_3)$$

$$(Ca^{++}) + (CO_3) \rightarrow CaCO_3$$

$$2K^+ + (CO_3) \rightarrow K_2CO_3$$

The overall reaction is:

$$Ca(OH)_2 + 2KHCO_3 \rightleftharpoons CaCO_3 + K_2CO_3 + H_2O$$

The $CaCO_3$ thus produced is precipitated out and could be sent back to the pressurized system, Unit Operation #1, for addition of calcium ions. The $CO_2$ which is required for the Unit Operation #1 reactor, can be supplied by product coming out of the stripper. The calcium hydroxide and $CO_2$ requirements can be readily determined by stoichiometric calculations based on the solubility product data of all reactants present, The $K_2CO_3$ which is produced in the Unit Operation #2 reactor is recirculated back to the absorber.

Among the principal advantages of the present invention over the prior art are the following: current technology permits the recovery of $CO_2$ from flue gases containing little or no sulfur dioxide. In accordance with current practice, the $SO_2$-contaminated $K_2CO_3$ solution is purged, requiring the addition of make-up solution, which is very costly. High cost has prevented the technology from being used to recover $CO_2$ from flue gases which are emitted by the majority of coal-fired plants. The process of the present invention would permit removal of $SO_2$ from the contaminated solution and eliminate the need for extensive purging, thereby providing a system which is economically attractive for the recovery of $CO_2$ from coal-fired power and cement plants and the like to supply $CO_2$.

In accordance with prior art, if the flue gas contained more $SO_2$ than could be effectively purged, an $SO_2$ removal system was placed ahead of the $CO_2$ removal system. This is likewise expensive. With the process of the present invention, $SO_2$ removal ahead of the $CO_2$ recovery system is not required, thus reducing the overall cost.

Having clearly and fully described our invention, it will be understood that changes may be made in the system as above set forth without departing from the spirit of the invention or exceeding the scope thereof as defined in the following claims.

What is claimed is:

1. In a process for recovering $CO_2$ from flue gas containing $CO_2$ and $SO_2$ wherein the flue gas is contacted with potassium carbonate solution, the $CO_2$ and $SO_2$ components absorbed therein to form a liquor containing $KHCO_3$ and $K_2SO_4$, and the $CO_2$ removed from the said liquor, the improvement which comprises:
    (a) converting the $K_2SO_4$ $_{L\ in\ the\ liquor\ to\ CaSO_4}$ by incorporating $Ca^{++}$ ions while adding $CO_2$ to the liquor in a pressurized vessel;
    (b) removing $CaSO_4$ from the resulting liquor of step (a);
    (c) conveying the liquor remaining from step (b) to a different container therefor;
    (d) removing calcium ions from the liquor of step (c) by precipitating out $CaCO_3$ by raising the pH of the liquor;
    (e) conveying the liquor remaining after step (d) to the potassium carbonate solution with which the flue gas is first contacted.

2. The process of claim 1 wherein the $Ca^{++}$ ions are supplied by the addition of lime or limestone.

3. The process of claim 1 wherein the $CO_2$ added in step (a) is at super-atmospheric pressure.

4. The process of claim 1 wherein the $CO_2$ addition of step (a) is sufficient to adjust the pH of the solution to about 6.

5. The process of claim 1 containing the additional step of adding the $CaCO_3$ from step (d) to the liquor of step (a).

* * * * *